Feb. 10, 1953
G. E. MAYBACH ET AL
2,627,748
BATTERY LIQUID LEVEL INDICATOR
Filed March 18, 1948
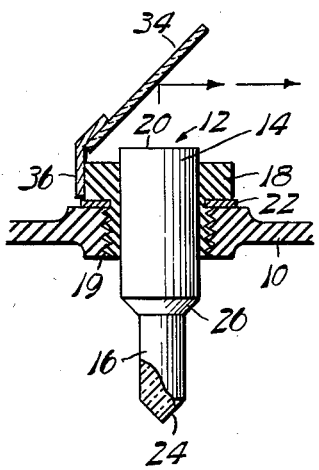
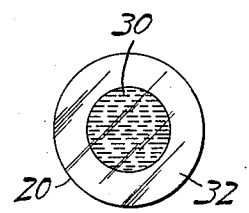
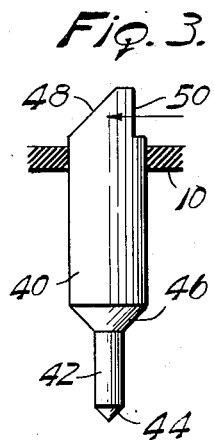
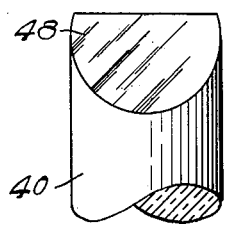
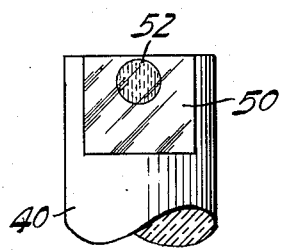
INVENTORS
Gerald E. Maybach & Almond H. Snyder
BY
Bean, Brooks, Buckley & Bean
ATTORNEYS Patented Feb. 10, 1953

2,627,748

UNITED STATES PATENT OFFICE 2,627,748

BATTERY LIQUID LEVEL INDICATOR

Gerald E. Maybach, Bowmansville, and Almond H. Snyder, Lancaster, N. Y., assignors to National Battery Company, St. Paul, Minn.

Application March 18, 1948, Serial No. 15,674

9 Claims. (Cl. 73—327)

This invention relates to improvements in storage batteries, and more particularly to an improved electrolyte level indicator means in storage batteries, wet cells, or the like.

As is well known, the water content of a storage battery electrolyte solution is constantly subject to evaporation and therefore must be replaced from time to time. In many storage battery installations it is difficult for the battery attendant to view the interior of the battery cell through the customary top cover plate opening, either for the purpose of inspecting the level of the battery liquid in relation to the minimum permissible level, or to observe the progress of a refilling operation so as to avoid overflowing of the cell. Such operations are particularly difficult when the battery is set in cramped quarters with insufficient head room thereabove, such as is typical for example in submarine battery mounting arrangements. In such cases it is undesirable to provide enough head room for the battery attendant to be enabled to maneuver himself into proper position to peer down through the battery top cover opening to observe the level of the electrolyte as with the aid of a flashlight or the like. In any case the difficulties attending such inspections are increased when the attendant is attempting to replenish the water supply and to simultaneously watch the progress of the rising liquid level incidental to the refilling operation.

Numerous efforts have been previously made to devise means circumventing the disadvantages and difficulties aforesaid, but the results thereof have been inadequate and in many cases the devices have been too complicated or otherwise impracticable; and therefore it is an object of the present invention to provide a simplified and improved battery liquid level indicator which eliminates the difficulties and disadvantages of the prior art.

Another object of the invention is to provide an improved battery liquid indicator which visually signals the relation of the existing liquid level to the designated permissible "low" and "high" levels thereof.

Another object of the invention is to provide an improved battery liquid level indicator for the purposes described, which is of utmost structural simplicity.

Another object of the invention is to provide a battery liquid level indicator which provides a visual liquid level signal of novel form.

A more specific object of the invention is to provide an improved liquid level indicator for the purposes aforesaid, which eliminates need of head room above the storage position of the battery.

Other objects and advantages of the invention will be apparent from the specification hereinafter.

In the drawing:

Fig. 1 is a fragmentary sectional view through a battery cover plate showing a liquid level indicator of the invention mounted thereon;

Fig. 2 is an illustration of the form of visual signal which is provided by the device of the invention;

Fig. 3 is a side elevation of another form of liquid level signaling device of the invention;

Fig. 4 is a fragmentary rear elevation, on an enlarged scale, of the device of Fig. 3; and Fig. 5 is a fragmentary front elevation, on an enlarged scale, of the device of Figs. 3–4, showing thereon the form of the liquid level signal which is provided by the device.

As illustrated, the invention comprises an elongate transparent member formed of glass or transparent plastic material or the like, which may be conveniently provided in generally cylindrical shape for mounting upon an apertured portion of a storage battery top cover plate such as is designated at 10 in Figs. 1 and 3. More specifically as shown in Fig. 1, the light transmitting member is illustrated at 12 to comprise an upper large diameter portion 14 and a lower smaller diameter portion 16. The portion 14 thereof is press-fitted within a ferrule 18 which is externally threaded as indicated at 19 so that the unit may be conveniently mounted in screwthreaded relation upon the battery cover plate 10 in such manner that the upper end face 20 of the member 12 is exposed exteriorly of the battery case while the inner end of the portion 14 and the portion 16 are disposed interiorly of the cell. Preferably, a gasket 22 is mounted under the head of the ferrule 18 to seal the juncture of the indicator device and the battery cover plate.

The extreme inner end of the indicator portion 16 is conically shaped at a 45° angle or thereabouts, as indicated at 24, and the shoulder between the large and small diameter portions 14—16 is also conically bevelled at a 45° angle as indicated at 26. The portions 14—16 are longitudinally dimensioned so that when the indicator device is mounted in operative position as shown in Fig. 1 the conical portion 24 will be thereby disposed at the elevation of the lowest permissible level of the battery electrolyte solution, while the bevelled portion 26 is thereby disposed at the elevation of the "high" level position for the electrolyte liquid. Thus, whenever the battery liquid falls below the tip of the conical portion 24, any light entering the indicator device through the end face 20 thereof will pass downwardly lengthwise of the unit and will then be reflected back from the bevelled faces 24—26 so as to illuminate the entire top face 20. If however the tip portion 24 is in wetted contact with the battery liquid this portion will not reflect light rays incident thereto, and hence the center portion of the end face 20 will appear to be darkened as indicated at 30 in Fig. 2 while the outer marginal portion 32 of the end face will still appear to be illuminated.

Whenever the battery liquid level rises so as to contact the bevelled shoulder portion 26 there will be no reflection of light of the type referred to hereinabove, and therefore the entire surface of the end face 20 including the areas designated 30—32 will appear to be blackened. Thus, it will be appreciated that the single transparent member 12 will provide easily visible indications of the relation of the battery liquid level to both the "high" and "low" permissible levels thereof.

As illustrated in Fig. 1, a mirror 34 may be conveniently mounted upon the ferrule 18 as by means of a bracket 36 so that the mirror will be disposed at any suitable angle to the long axis of the member 12, and is adjustable so that an image of the liquid level visual indication at the top face 20 will be projected laterally so as to be readily visible at a position to one side of the battery and at an elevation only slightly above the top surface of the battery. In such case the type of image which is illustrated in Fig. 2 will be seen in the mirror 34, and thus it will be understood that the indicator of the invention provides a novel and improved multiple level liquid checking device which is of utmost structural simplicity.

It will also be appreciated that whereas Figs. 1-2 illustrate for example only a dual level indicator, the shaft piece 12 may if desired be formed to include any other number of successively stepped portions so as to provide further progressive subdivided indications of the liquid level movement. It is also preferred in the case of the present invention to coat the tip end portion 24 with a colored lacquer or the like, so that whenever the liquid level recedes away from contact with the tip end 24 the latter will reflect a red or otherwise colored "bull's-eye" into the center portion of the image which is projected through the end face 20, as indicated at 30 in Fig. 2.

Figs. 3, 4 and 5 illustrate a modified form of the indicator device of the invention, which comprises a transparent body 40 having a reduced diameter lower end portion 42 terminating in a conical tip 44 and including a bevel shoulder 46 at the juncture between the large and small body portions. Distinguishing from the form of the invention shown in Figs. 1-2, the device of Figs. 3-5 is formed at its upper end with a 45° bevelled side portion 48 and a flatted front face 50 at a position diametrically opposite the side portion 48. Thus, whenever the device of Figs. 3-5 is inserted through an apertured portion of a battery cover plate as indicated at 10, the light rays returning upwardly from the reflective surfaces 44—46 will be again reflected interiorly of the device against the surface 48 and thence through the flat surface 50 in a direction laterally thereof. Thus, as explained hereinabove in connection with the device of Figs. 1-2 if the tip portion 44 of the device of Fig. 3 is in contact with battery liquid, a darkened spot will appear against the face 50 as indicated at 52 (Fig. 5). Likewise, if the liquid is also in contact with the bevelled surface 46, a correspondingly larger darkened spot will substantially cover the flat surface 50 when the latter is viewed from the front thereof.

Thus, it will be appreciated that the invention provides an extremely simple device for multiple level indicating purposes, whereby the relation of the existing battery liquid level of the permissible "low" and "high" levels thereof is readily viewable either from a position directly above the device or from a position sidewise thereof so that no substantial head room above the battery is required.

We claim:

1. In a wet battery cell, a liquid level indicator comprising an elongate transparent member mounted to extend into the interior of the cell with one end face of the device directed outwardly of the cell, the portion of said device extending interiorly of the cell comprising progressively reduced diameter columnar sections arranged coaxially and each terminating in a bevelled portion inclined relative to the long axis of the device, and a mirror mounted adjacent the outer end portion of the device and inclined relative to the outwardly directed end face of the device.

2. In a wet battery cell, a liquid level indicator comprising an elongate transparent member mounted to extend into the interior of the cell with one end face of the device directed outwardly of the cell, the portion of said device disposed interiorly of the cell comprising progressively offset sections each terminating in a bevelled portion inclined relative to the long axis of the device, the outwardly projecting end portion of the device being bevelled at one side thereof and flatted parallel to the longitudinal axis of the device at a position diametrically opposed to the bevelled side portion.

3. A battery liquid level indicator device for mounting upon the top cover portion of a battery cell to extend vertically downwardly thereinto and into contact with the liquid within the cell, said device comprising a vertically elongate member of transparent material having a plurality of progressively reduced sectional dimension portions arranged longitudinally thereof and outlined by offset surfaces disposed parallel to the vertical axis of said member, said portions each terminating in a bevelled shoulder formation.

4. A battery liquid level indicator device for mounting upon the top cover portion of a battery cell to extend downwardly thereinto and into contact with the liquid within the cell, said device comprising an elongate member of transparent material having a plurality of progressively reduced sectional dimension portions arranged longitudinally thereof, said portions each terminating in a light-reflective ledge formation, the outer end portion of said member being extended beyond the battery top cover and being bevelled at one side and flatted at the diametrically opposite side thereof.

5. In a wet battery cell, a liquid level indicator device comprising a transparent member of generally columnar shape mounted to extend into the interior of the cell with one end face of the device flatted and directed outwardly of the cell, the portion of said device disposed interiorly of the cell comprising progressively reduced diameter cylindrical portions disposed in successive coaxial relationship longitudinally of the device, each of said portions being outlined by surface elements parallel to the vertical axis of symmetry of said device and terminating in an annular portion bevelled to incline relative to the long axis of the device.

6. In a wet battery cell, a liquid level indicator comprising a transparent member of generally columnar shape mounted to extend into the interior of the cell with one end face of the device directed outwardly of the cell, the portion of said device disposed interiorly of the cell comprising progressively reduced diameter sections, each of said sections terminating in a bevelled portion inclined relative to the long axis of the device, the outwardly projecting end portion of the device being bevelled at one side thereof and flatted parallel to the longitudinal axis of the device at a position diametrically opposed to the bevelled side portion.

7. A battery liquid level indicator device for mounting upon the top cover portion of a battery cell to extend downwardly thereinto and into contact with the liquid within the cell, said device comprising a generally columnar shaped member of transparent material having a plurality of longitudinally progressively reduced sectional dimension portions arranged axially thereof, said portions each terminating in a 45 degree bevelled shoulder formation, the outer end portion of said member being extended beyond the battery top cover and being 45 degree bevelled at one side and flatted at the diametrically opposite side thereof.

8. In a wet battery cell, a liquid level indicator comprising an elongate transparent member mounted to extend into the interior of the cell with one end face of the device directed outwardly of the cell, the portion of said device extending interiorly of the cell comprising progressively reduced diameter columnar sections arranged coaxially and each terminating in a light reflective ledge portion.

9. A battery liquid level indicator device for mounting upon the top cover portion of a battery cell to extend downwardly thereinto and into contact with the liquid within the cell, said device comprising a generally cylindrical shaped member of transparent material having a plurality of progressively reduced sectional dimension portions arranged coaxially longitudinally thereof, said portions each terminating in a 45° bevelled shoulder formation, said formations being correspondingly spaced longitudinally of said member and adapted to contact successively with the battery cell liquid as the surface thereof assumes specific correspondingly spaced levels.

GERALD E. MAYBACH.
ALMOND H. SNYDER.

REFERENCES CITED

The following references are of record in the file of this patent:

UNITED STATES PATENTS

| Number | Name | Date |
|---|---|---|
| 461,370 | Seidensticker | Oct. 13, 1891 |
| 773,154 | McFerran | Oct. 25, 1904 |
| 1,883,971 | Kryzanowsky | Oct. 25, 1932 |
| 2,301,460 | Sauer | Nov. 10, 1942 |
| 2,368,705 | Du Pont et al. | Feb. 6, 1945 |
| 2,468,833 | Murphy | May 3, 1949 |

FOREIGN PATENTS

| Number | Country | Date |
|---|---|---|
| 412,803 | Great Britain | July 5, 1934 |